US012719875B1

(12) United States Patent
Cunningham et al.

(10) Patent No.: US 12,719,875 B1
(45) Date of Patent: Aug. 25, 2026

(54) GENERATING SYNTHESIZED CONNECTORS FOR A GROUP OF USER ACCOUNTS FOR ACCESS TO SHARED CONTENT ITEMS

(71) Applicant: Dropbox, Inc., San Francisco, CA (US)

(72) Inventors: Eric Cunningham, Kirkland, WA (US); Aniruddh Rao, Sammamish, WA (US); Brian T. Schroeder, Brooklyn, NY (US); Marius Bunescu, Redmond, WA (US); Ryan Morlok, Inver Grove Heights, MN (US); Sabarish Mahadevan, Arrington, TN (US); Dmitriy Meyerzon, Bellevue, WA (US); Sean-Michael Lewis, Oakland, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 19/184,458

(22) Filed: Apr. 21, 2025

(51) Int. Cl.
*H04L 9/40* (2022.01)

(52) U.S. Cl.
CPC .......... *H04L 63/101* (2013.01); *H04L 63/102* (2013.01)

(58) Field of Classification Search
CPC ............................ H04L 63/101; H04L 63/102
See application file for complete search history.

(56) References Cited

U.S. PATENT DOCUMENTS 6,275,831 B1 8/2001 Bodnar et al.
6,915,312 B2 7/2005 Bodnar et al.
7,318,110 B2 * 1/2008 Yumoto .................. G06F 3/067 709/248
7,533,157 B2 5/2009 Hu et al.
7,886,000 B1 * 2/2011 Polis ....................... H04L 67/02 713/168
9,141,617 B1 * 9/2015 Gargi .................... G06F 16/435
9,177,000 B2 11/2015 Budinsky et al.
9,177,001 B2 11/2015 Budinsky et al.
9,910,890 B2 3/2018 Bishop et al.
9,985,998 B1 * 5/2018 Lewis ..................... H04L 51/52
10,021,059 B1 * 7/2018 Rao ........................ G06Q 50/01
10,942,991 B1 * 3/2021 Kidd ..................... G06F 16/954
2004/0122849 A1 6/2004 Nelson
2007/0043759 A1 * 2/2007 Bodin .................. G06F 16/258 707/999.102

(Continued)

*Primary Examiner* — Jason Chiang
(74) *Attorney, Agent, or Firm* — Keller Preece PLLC

(57) ABSTRACT

The present disclosure relates to systems, non-transitory computer-readable media, and methods for generating a synthesized connector that defines a single data ingestion path with shared access control for multiple users within a group or organization. In particular, the disclosed systems can identify a set of content items retrieved through individual user connectors associated with user accounts belonging to the same group. Based on the identified content items, the disclosed systems can generate a synthesized connector that unifies the individual connectors in a single, group-scoped ingestion path that governs access control for all associated users. Additionally, the disclosed systems can deduplicate shared content data across the synthesized connectors to generate a synthesized content item. The disclosed systems can update a data repository (e.g., a search index) to include the synthesized content item to improve retrieval accuracy, reduce redundancy, and ensure consistent access control across the group.

20 Claims, 9 Drawing Sheets

(56) References Cited

U.S. PATENT DOCUMENTS

2007/0100872 A1* 5/2007 Bodin ........................ G06F 8/20
707/999.102
2007/0192327 A1* 8/2007 Bodin ................. G06F 16/9535
2007/0192674 A1* 8/2007 Bodin ................... G06F 16/958
715/205
2007/0214147 A1* 9/2007 Bodin ................... G06F 16/958
2007/0214148 A1* 9/2007 Bodin ................... H04L 65/611
2007/0214149 A1* 9/2007 Bodin ................... G06F 16/436
2007/0214485 A1* 9/2007 Bodin ................. G06F 16/9577
725/101
2008/0183674 A1* 7/2008 Bush ........................ G06F 16/83
707/E17.127
2011/0173235 A1* 7/2011 Aman .................... G06V 40/23
707/E17.055
2012/0179654 A1 7/2012 Lukiyanov et al.
2014/0149463 A1 5/2014 Uola
2014/0304247 A1* 10/2014 Fastlicht ................. G06F 16/40
707/706
2014/0321332 A1* 10/2014 Jeon .................. H04M 3/42017
370/259
2017/0323018 A1* 11/2017 Angelova .......... G06Q 30/0277
2017/0332146 A1* 11/2017 Klappert ............ H04N 21/2665
2019/0156442 A1* 5/2019 Zuluaga ............... G06Q 50/163
2020/0004853 A1 1/2020 Prasad et al.
2021/0027870 A1* 1/2021 West ...................... G16H 10/60
2021/0065146 A1* 3/2021 Zarefoss .............. G06Q 50/205
2021/0133681 A1* 5/2021 Dhaliwal ............. G06Q 10/101
2023/0025808 A1* 1/2023 Gupta ..................... H04L 63/10
2023/0385315 A1* 11/2023 Jiao ..................... G06F 16/9532
2024/0257218 A1* 8/2024 Vaughan .............. G06N 3/0442
2024/0273793 A1* 8/2024 DeCharms ............ G06F 40/197
2025/0110690 A1* 4/2025 Bates ...................... G06F 3/167

* cited by examiner

GENERATING SYNTHESIZED CONNECTORS FOR A GROUP OF USER ACCOUNTS FOR ACCESS TO SHARED CONTENT ITEMS

BACKGROUND

Recent years have seen significant development in generating and storing content across various applications and locations. For example, the advancement of computer applications has allowed users to perform various and/or specialized tasks with certain applications. For example, a user can generate an image with a first computer application and draft a document with a second application. Indeed, the diversification and advancement in computer applications, specialized computer applications, and/or third-party systems, causes users to generate separate user accounts across several computer applications and/or third-party systems, thus forcing users to perform tasks and store information across multiple platforms. Additionally, in some examples, two or more users can join a group to collaborate on content items across third-party systems or applications. Many conventional systems try addressing access to third-party content items across multiple users by utilizing architectures to build team connections between a group of users and a shared content item or maintain individual connections between individual users and copies of the shared content item. Despite these advancements, systems and groups of user accounts struggle to search, access, and collaborate on shared content items in an efficient and flexible manner.

As just mentioned, some existing systems are computationally inefficient. Some existing systems maintain individual connections to third-party content items for each user account within a group. The maintenance of individual connections often leads to unnecessary duplication of data and resource consumption. For example, some existing systems create and maintain individual user connections used to process and store content from third-party systems. Existing systems also often expend additional computational and storage resources to repeatedly re-ingest and store identical content items, such as shared documents, messages, media, etc., for each user with access to the same content item. Processing and storing multiple copies of the same content increases superlinearly with the amount of content indexed by multiple user accounts. Thus, many existing systems that establish individual connections from different users to the same content are computationally inefficient.

Additionally, such existing systems often fail to generate and operate accurate search indexes. In particular, storing multiple copies of the same content item often results in existing systems calculating inaccurate term frequencies and document frequencies because. To illustrate, existing systems that process content on a per-user basis may overcount term occurrences and inflate document frequency values, which skews document frequency-based weighting, leading to inaccurate weighting scores. As a result, common terms often appear overly important or truly relevant documents are ranked lower within a search index, ultimately degrading the quality and accuracy of a search experience. Accordingly, many existing systems face technical struggles in generating and operating accurate search indexes with shared content items.

Some existing systems attempt to overcome the above-mentioned shortcomings by creating and maintaining shared connections created by an admin on behalf of a group of users. However, shared connections can also be computationally expensive and inflexible. Indeed, some existing systems, such as some third party repositories, do not support shared connections and are limited to utilizing individual connections. In particular, maintaining a shared connection across multiple users requires careful coordination to ensure consistency, access control, and data integrity. With multiple users accessing the same shared connection, ensuring proper permissions and preventing data leakage or unauthorized actions becomes more complex. Furthermore, existing systems must frequently update shared content items and manage session state or caching strategies to avoid serving stale data to users. Thus, while shared connections can reduce duplication and improve efficiency in some ways, building and maintaining the shared connections is costly to both build and maintain.

SUMMARY

One or more embodiments described herein provide benefits and/or solve one or more problems in the art with systems, methods, and non-transitory computer readable storage media that generate a synthesized connector that comprises a single data ingestion path that defines access control for a group of users. In one or more embodiments, the synthesized connector management system can identify a set of content items originating from a set of user connectors, where the associated users belong to the same group or organization. The synthesized connector management system can further generate a synthesized connector that combines the set of user connectors into a single data ingestion path that defines access control for user accounts associated with the user connectors. The synthesized connector management system can further generate a synthesized content item by deduplicating and/or merging content data included in the shared content items. Additionally, the synthesized connector management system can update a data repository to include the synthesized content item with synthesized access control.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
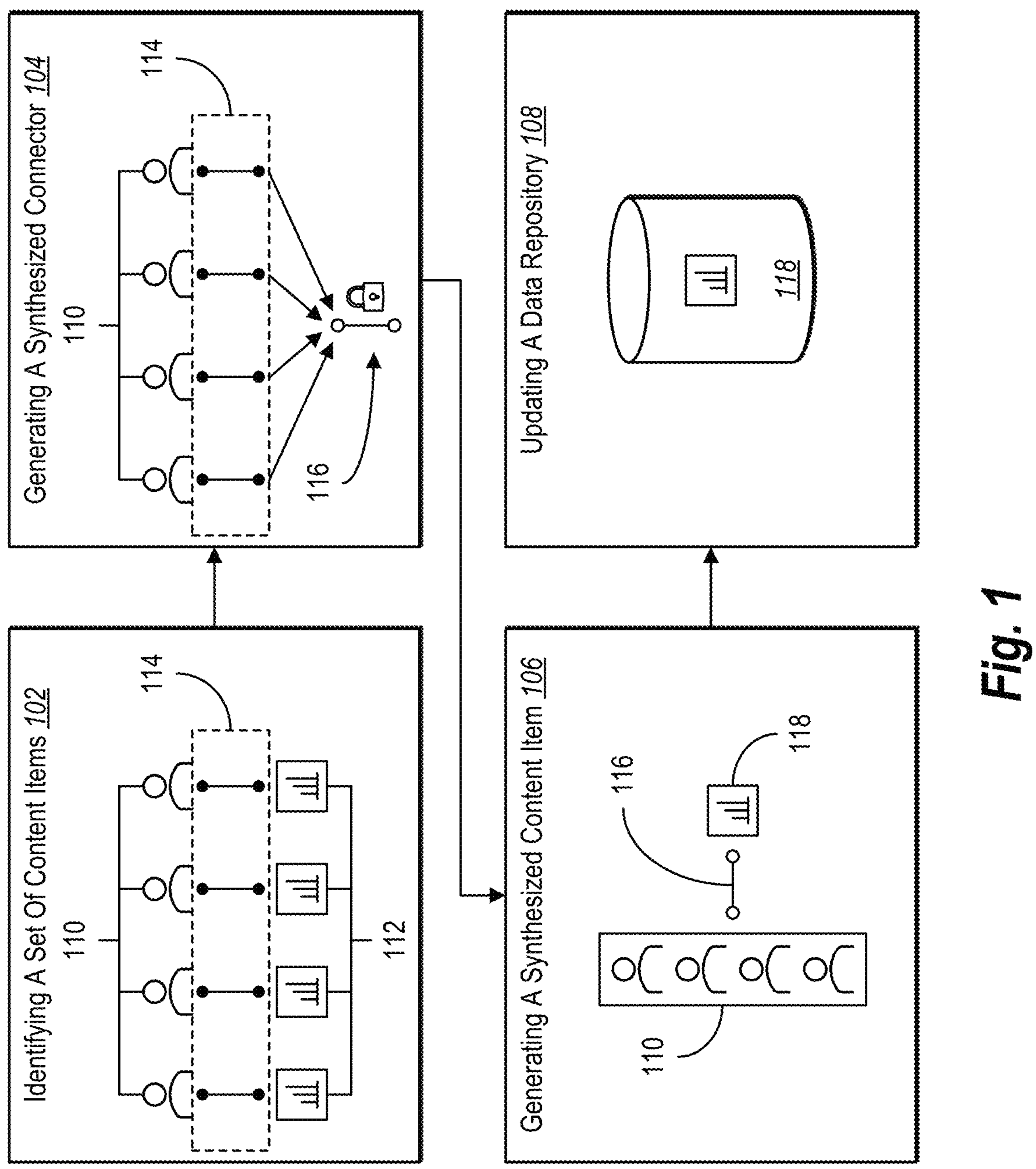
FIG. 1 illustrates an example overview of a synthesized connector management system updating a data repository to include a synthesized content item in accordance with one or more embodiments.

This disclosure describes embodiments of a synthesized connector management system that improves the effectiveness, efficiency, and accuracy of content searches across content items ingested via synthetic connectors by generating and utilizing synthesized connectors that combine account-level application connectors into single data ingestion paths. FIG. 1 illustrates an example overview of a synthesized connector management system updating a search index to include a synthesized content item in accordance with one or more embodiments.

As shown in FIG. 1, the synthesized connector management system 120 (further described in FIG. 7) can perform an act 102 of identifying a set of content items. In particular, the synthesized connector management system 120 identifies a set of content items 112 originating from a set of account-level application connectors 114 of an individual connector type. For example, the synthesized connector management system 120 can identify a set of users 110 that belong to a group. The synthesized connector management system 120 further determines that the set of users 110 have access to the set of content items 112 that comprise the same content item. The set of content items 112 may comprise content items having a shared content item identifier (e.g., a content item ID) that are hosted by a third-party system.

As further shown in FIG. 1, the synthesized connector management system 120 can perform an act 104 of generating a synthesized connector. In particular, the synthesized connector management system 120 combines the account-level application connectors 114 into a single data ingestion path that defines access control for user accounts associated with the set of users 110. As shown in FIG. 1, the synthesized connector management system 120 generates a synthesized connector 116 that aggregates user-level content data and permissions. The synthesized connector management system 120 can use the synthesized connector 116 to construct a team-like view of a shared content item or a shared portion of a content item. In some implementations, the synthesized connector 116 is associated with an access control list that indicates users authorized to access the associated content item.

In some embodiments, the synthesized connector management system 120 performs the act 104 of generating the synthesized connector using different types of account-level application connectors 114. In particular, the synthesized connector management system 120 can generate the synthesized connector by combining a first type of account-level application connector and a second type of account-level application connector. For example, the synthesized connector management system 120 can use individual, team, or service-level connectors to create distinct views of the same content item through a synthesized connector. Each connector type provides a unique context for access. The synthesized connector aggregates different perspectives and links relevant source content, layers their metadata, access rights, and context into a unified synthesized content item.

Figure 3:
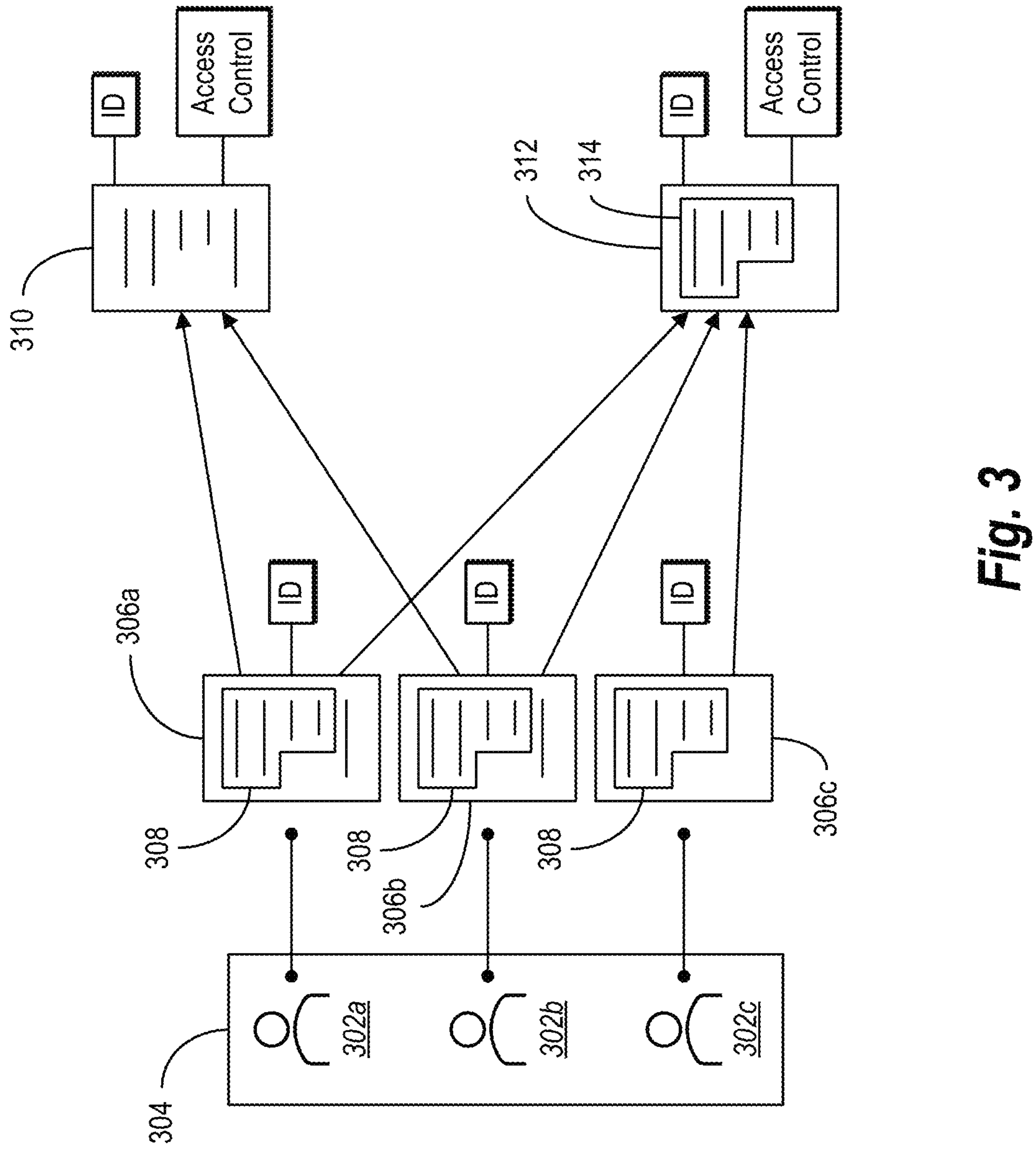
FIG. 3 illustrates a synthesized connector management system deduplicating content items or portions of content items to generate an aggregated synthesized content item in accordance with one or more embodiments.

FIG. 1 illustrates the synthesized connector management system 120 performing an act 106 of generating a synthesized content item. In particular, the synthesized connector management system 120 generates, through the synthesized connector 116, a synthesized content item 118 by deduplicating content data included in the set of content items 112. More specifically, the synthesized connector management system 120 consolidates different users' views of the set of content items 112 (or other cloud entities) coming from the set of account-level application connectors 114. FIG. 3 and the corresponding discussion further detail the synthesized connector management system 120 deduplicating content items to generate a synthesized content item in accordance with one or more embodiments.

As further illustrated in FIG. 1, the synthesized connector management system 120 performs an act 108 of updating a data repository. In particular, the synthesized connector management system 120 updates a data repository to include the synthesized content item 118. The data repository may comprise a search index. Thus, instead of ingesting and storing redundant copies of the same content item, the synthesized connector management system 120 can store a single synthesized content item for the set of users 110. Furthermore, the synthesized connector management system 120 can perform a content search by searching across synthesized content items ingested via synthesized connectors. The synthesized connector management system 120 can read access control (e.g., a synthesized access control list) associated with the synthesized connectors to only surface content items (or portions of content items) from the index that a searching user account is allowed to access.

As illustrated by the foregoing discussion, the present disclosure utilizes a variety of terms to describe the features and benefits of the connector management system. Additional detail is hereafter provided regarding the meaning of these terms as used in this disclosure. For example, as used herein, the term "content management system" refers to a software application system that can be used to create, facilitate, access, and/or manage digital documents across one or more computer networks. In particular, a content management system can provide a centralized platform for managing and organizing digital content, while also facilitating digital content item (e.g., document) management across user accounts. For example, DROPBOX is a content management system that provides many digital content management functions, including file synchronization across devices and between user accounts, real-time editing, commenting, version control, and task assignment. Furthermore, content management systems can import digital content items from third-party systems.

Furthermore, as used herein, the term "third-party system" refers to a computing system that performs one or more function that corresponds to a third-party external to a content management system. For example, a third-party system can enable performing certain tasks such as, but not limited to, photo editing, document creation, financial reporting, medical recording, etc. In one or more embodiments, a third-party system's functionality can be accessed via third-party applications comprising a desktop application, mobile-based operating application, or web-based application.

As used herein, the term "digital connection" (or more simply "connector") refers to a computer code segment, application, or program that retrieves or extracts data and/or features that define information from user-account-facing applications (e.g., third-party applications), such as digital calendars, video call applications, email applications, text messaging applications, digital document applications, financial applications, medical applications, and other applications. In some cases, a connector is as described by Vasanth Krishna Namasivayam et al. in U.S. patent application Ser. Nos. 18/478,061 and 18/478,066, titled GENERATING AND MAINTAINING COMPOSITE ACTIONS UTILIZING LARGE LANGUAGE MODELS, filed Sep. 29, 2023, both of which is incorporated herein by reference in their entireties. In one or more implementations, a connector is as described by Aniruddh Rao et al. in U.S. patent application Ser. No. 18/776,830, titled DATA INGESTION UTILIZING A COORDINATOR AND CONNECTORS, filed Jul. 18, 2024. A digital connection can use web hooks, long polling, another protocol to ingest content from an external source (e.g., third-party application) into the environment of a content management system for interaction with content management system functions, including those of a connector management system. Additionally, in some cases, connectors can be suggested based on browsing data as described by Andrew Warr et al. in U.S. patent application Ser. No. 19/003,694, titled GENERATING CONNECTOR SUGGESTIONS BASED ON BROWSING DATA, filed Dec. 27, 2024, which is incorporated herein by reference in its entirety.

As used herein, the term "account-level application connector" refers to a dedicated integration that enables an individual user account's access to third-party data. In particular, an account-level application connector ingests data accessible by the particular user's account into a private index accessible by the particular user alone. The account-level application connector operates at a user level and maintains a direct and isolated connection between a user's account and an external third-party system.

Relatedly, and as used herein, the term "synthesized connector" refers to a shared integration that enables multiple users within a group or organization to access third-party data through a single data ingestion path. In particular, a synthesized connector ingests data accessible by a set of users into a data repository (e.g., a search index) accessible by the set of users. The synthesized connector operates at a group level and maintains connections between a set of user accounts and a shared content item from an external third-party system.

Additionally, as used herein, the term "digital content item" (or simply "content item") refers to a digital object or a digital file that includes information interpretable by a computing device (e.g., a client device) to present information to a user. A digital content item can include a file or a folder such as a digital text file, a digital image file, a digital audio file, a webpage, a website, a digital video file, a web file, a link, a digital document file, or some other type of file or digital object. A digital content item can have a particular file type or file format, which may differ for different types of digital content items (e.g., digital documents, digital images, digital videos, or digital audio files). In some cases, a digital content item can refer to a remotely stored (e.g., cloud-based) item or a link (e.g., a link or reference to a cloud-based item or a web-based content item) and/or a content clip that indicates (or links/references) a discrete selection or segmented sub-portion of content from a webpage or some other content item or source. A content item can also include application-specific content that is specific to a particular computer application and is accessible via a file system or via a network connection. A digital content item can be editable or otherwise modifiable and can also be sharable from one user account (or client device) to another. In some cases, a digital content item is modifiable by multiple user accounts (or client devices) simultaneously and/or at different times.

Relatedly, as used herein, the term "synthesized content item" refers to a virtual content item synthesized using data from a synthesized connector. In particular, a synthesized content item may comprise content data included in a set of redundant content items. A synthesized content item comprises a content item that is generated, stored, and indexed once. The synthesized content item is also accessible to authorized users. For example, a synthesized content item can comprise a whole or portion of a content item that is shared between a group of users.

As used herein, the term "access control" refers to security mechanisms that determine how users, systems, or processes, are granted or denied permission to access resources within a system, network, or application. In particular, access control refers to a security mechanism that governs which users are permitted to access specific content items. Access control can be defined by an access control mechanism. One example of an access control mechanism includes an Access Control List (ACL), which explicitly defines permissions associated with each user or group for a given content item. An ACL can specify actions such as read, write, or execute, and maps the actions to users or roles. In some implementations, the synthesized connector management system generates a synthesized ACL that specifies read data based on read data from the account-level application connectors. In some examples, an ACL can be associated with a content item hosted by a third-party system or a synthesized content item stored by a content management system.

As used herein, the term "data repository" refers to a centralized place where data is stored within a system. In particular a data repository organizes data in a way that supports efficient querying, versioning, sharing, analysis, and computation. A data repository can take many forms depending on the structure and purpose of the stored data. For example, a data repository can comprise a traditional relational database, a file system, or a specialized system such as a data lake, data warehouse, search index, machine learning feature store, or other data storage system.

In some examples, a data repository can comprise a search index. As used herein, the term "search index" refers to a structured data representation that enables retrieval of information within a system. In particular, a search index maps keywords or terms to their locations in a dataset. A search index can enable a search engine to identify relevant content items without scanning the entire corpus of data. In some examples, a search index includes metadata such as term frequencies, document identifiers, and additional fields such as timestamps, authors, or access controls.

As indicated above, the synthesized connector management system 120 provides several advantages over conventional systems. In particular, the synthesized connector management system 120 provides improved computational efficiency, navigational accuracy, and flexibility over existing systems.

For example, the synthesized connector management system 120 can improve computational efficiency over existing content management systems. The synthesized connector management system 120 improves computational efficiency by generating a synthesized connector that combines account-level application connectors into a single data stream. In contrast to existing content management systems that rely on individual user-level connectors to repeatedly ingest and store redundant content data from third-party systems, the synthesized connector management system 120 can use a synthesized connector to efficiently ingest shared content data. Furthermore, instead of storing multiple copies of the same content item, the synthesized connector management system 120 generates, via the synthesized connector, a synthesized content item that includes content data from a set of shared content items. More specifically, the synthesized connector management system 120 can utilize a deduplicator to minimize redundancies and generate a synthesized content item.

Furthermore, the synthesized connector management system 120 can improve the accuracy of search indexes relative to existing content management systems. The synthesized connector management system 120 improves search efficiency and accuracy by storing synthesized content items in a search index. In contrast to existing systems that store multiple copies of the same content data within a search index, the synthesized connector management system 120 can store a single synthesized content item for a group of users, which eliminates redundancy and ensures consistency. By storing a single synthesized content item within a search index, the synthesized connector management system 120 reduces the size of the search index, leading to faster query processing and lower storage requirements. Indexing a single synthesized content item further ensures that term and document frequencies are accurately calculated, which improves the relevance of search results. By centralizing access to a single synthesized content item, the synthesized connector management system 120 avoids inconsistencies in visibility or ranking and provides a more accurate search experience for users.

The synthesized connector management system 120 further improves computational efficiency and flexibility relative to existing systems that rely on shared or team connectors. In contrast to a static shared connector that maintains a persistent shared connection to a third-party system, the synthesized connector management system 120 generates a dynamic synthesized connector that can generate access or views by aggregating user-level data and permissions. In particular, the synthesized connector management system 120 can aggregate account-level application connectors into a single data ingestion path. This approach reduces the need for always-on infrastructure and avoids duplicating effort across systems. The synthesized connector management system 120 can dynamically construct a group-level view of a content item without incurring the full cost of maintaining a shared state. Thus, the synthesized connector management system 120 can make synthesized connectors more scalable, adaptable to changes in access, and efficient.

Figure 2:
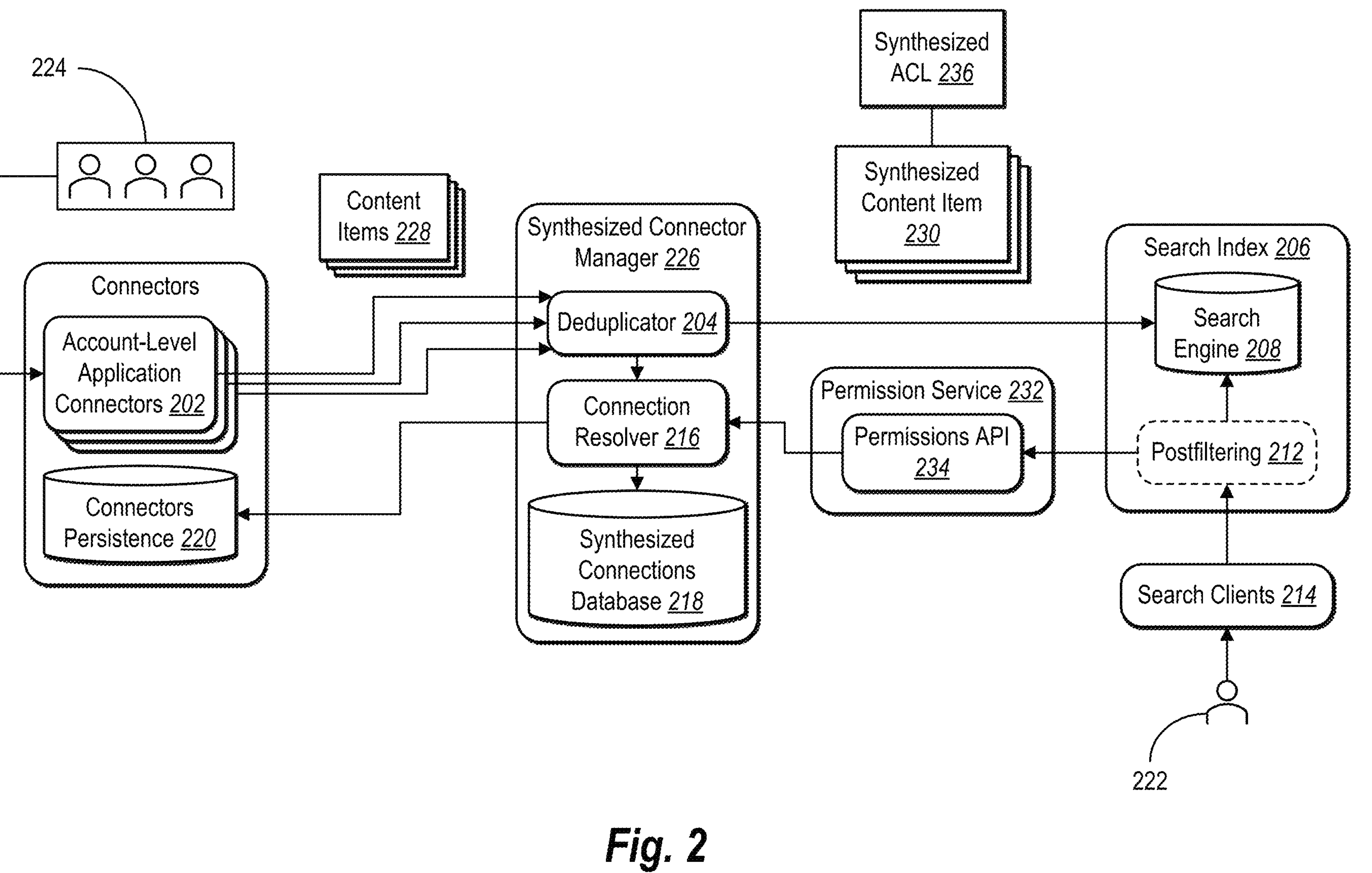
FIG. 2 illustrates an overview of the synthesized connector management system generating a synthesized content item and executing a search request in accordance with one or more embodiments of the present disclosure.

As discussed, the synthesized connector management system 120 can store synthesized content items in a search index to improve search efficiency and accuracy. FIG. 2 illustrates an overview of the synthesized connector management system 120 generating a synthesized content item and executing a search request in accordance with one or more embodiments of the present disclosure.

As shown in FIG. 2, the synthesized connector management system 120 identifies a set of user accounts associated with users within a group. As illustrated, the set of user accounts 224 corresponds to individual users who belong to a common group or organization. For example, the set of user accounts 224 can belong to users within the same team, department, or company. By identifying the set of user accounts 224, the synthesized connector management system 120 can coordinate access to shared resources, streamlined collaboration, and generally provide more efficient and secure context-aware functionality across teams, groups, or organizations. In some implementations, the synthesized connector management system 120 automatically determines the set of user accounts 224 based on content items linked to the set of user accounts 224. For example, the synthesized connector management system 120 can suggest, to the set of user accounts 224, formation of a group based on the user accounts sharing a threshold number of identical content items. In other implementations, the synthesized connector management system 120 determines the set of user accounts 224 based on user input. For instance, the synthesized connector management system 120 can receive, from an admin or user associated with an organization or group, the identification of set of user accounts 224 that belong within a group.

As illustrated in FIG. 2, each user account in the set of user accounts 224 corresponds with an account-level application connector. Each of the account-level application connectors links a third-party system to the content management system. In some embodiments, the account-level application connectors 202 are connectors of an individual connector type. More specifically, an individual connector type establishes a separate connection for each user account, allowing personalized access to third-party data based on the user account's credentials and permissions. For instance, a database can use the account-level application connectors 202 to access the set of content items 228 for individual user accounts. In contrast, a group connector type creates a shared connection that serves multiple users within a team or organization, enabling collective access to content through a single integration.

As shown in FIG. 2, the synthesized connector management system 120 utilizes a synthesized connector manager 226 to generate and manage synthesized connectors. As shown in FIG. 2, the synthesized connector manager 226 comprises a deduplicator 204. In some embodiments, the synthesized connector management system 120 utilizes the deduplicator 204 to identify a set of account-level application connectors that link to the same content item. In some A system may include at least one processor. A system may include a non-transitory computer readable medium comprising instructions that, when executed by the at least one processor, cause the system to. A system may include identify, from a plurality of content items ingested into a content management system through account-level application connectors, a set of content items originating from a set of account-level application connectors of an individual connector type. A system may include generate a synthesized connector that combines the set of account-level application connectors into a single data ingestion path that defines access control for user accounts associated with the account-level application connectors. A system may include generate, through the synthesized connector, a synthesized content item by deduplicating content data included in the set of content items. A system may include update a search index to include the synthesized content item. A synthesized connector management system may include at least one processor. A synthesized connector management system may include a non-transitory computer readable medium comprising instructions that, when executed by the at least one processor, cause the system to. A synthesized connector management system may include identify, from a plurality of content items ingested into a content management system through account-level application connectors, a set of content items originating from a set of account-level application connectors of an individual connector type. A synthesized connector management system may include generate a synthesized connector that combines the set of account-level application connectors into a single data ingestion path that defines access control for user accounts associated with the account-level application connectors. A synthesized connector management system may include generate, through the synthesized connector, a synthesized content item by deduplicating content data included in the set of content items. A synthesized connector management system may include update a search index to include the synthesized content item. embodiments, the deduplicator 204 uses content item identifiers associated with the account-level application connectors 202 to identify a set of account-level application connectors that refer to the same underlying content item (e.g., the set of content items 228). FIG. 3 and the corresponding discussion further describe the synthesized connector management system 120 using the deduplicator 204 to identify the set of account-level application connectors based on content item identifiers in accordance with one or more embodiments of the present disclosure.

Furthermore, in some implementations, the synthesized connector management system 120 utilizes the deduplicator 204 to generate a synthesized connector. Generally, the synthesized connector management system 120 utilizes the deduplicator 204 to combine the set of account-level application connectors into a single data ingestion path. Furthermore, the deduplicator 204 can generate an access control mechanism (e.g., an access control list) and link the access control mechanism to the single data ingestion path. The synthesized connector management system 120 uses the access control mechanism (e.g., an access control list) to manage and enforce permissions associated with the synthesized connector. FIG. 3 and the corresponding discussion describe the synthesized connector management system 120 using the deduplicator to generate and update an access control mechanism (e.g., an access control list) that defines which user accounts have permission to access a synthesized content item.

Figure 5:
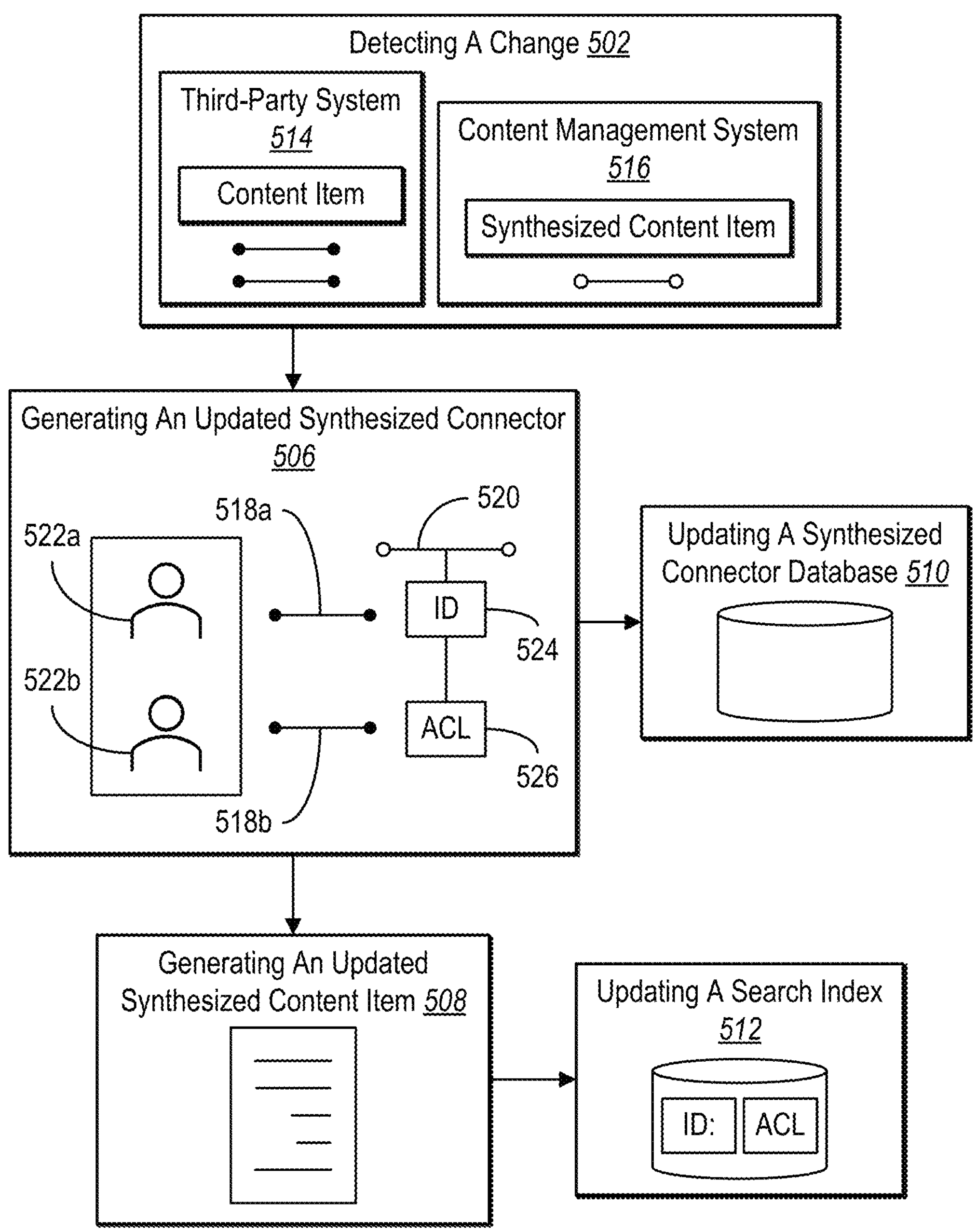
FIG. 5 illustrates the synthesized connector management system updating a search index with an updated synthesized content item in accordance with one or more embodiments of the present disclosure.

In some implementations, the synthesized connector management system 120 utilizes the deduplicator 204 to send synthesized connector data and/or synthesized content item data to a connection resolver 216 to facilitate searches. In some embodiments, the synthesized connector management system 120 utilizes the deduplicator 204 to send synthesized connector data to a synthesized connections database 218 for storage. In some embodiments, the deduplicator 204 can further update synthesized connections, access control mechanisms, metadata, or other data within the synthesized connections database 218. FIG. 5 illustrates the synthesized connector management system 120 updating the synthesized connections database in accordance with one or more implementations of the present disclosure.

The synthesized connector management system 120 can utilize a cache manager instead or in addition to the deduplicator 204 illustrated in FIG. 2. In particular, while the deduplicator 204 eliminates duplicate copies of the same data, the synthesized connector management system 120 can utilize a cache manager to cache the first copy of a content item that the synthesized connector management system 120 ingests. More specifically, the synthesized connector management system 120 utilizes a cache manager to speed up access to previously ingested data by storing a synthesized content item comprising the ingested data. When another user account requests to access the same content item, based on the content item identifier, the synthesized connector management system 120 can retrieve the synthesized content item from a cache.

As further illustrated in FIG. 2, the synthesized connector management system 120 can generate a synthesized content item 230. In particular, the synthesized connector management system 120 can generate, through the synthesized connector, a synthesized content item by deduplicating and/or merging content data included in the set of content items 228. Generally, the synthesized content item 230 comprises a virtual representation of the set of content items 228. In particular, the synthesized content item 230 represents aggregated, inferred, or combined data reflecting the set of content items 228. For instance, the synthesized connector management system 120 can combine information from the set of account-level application connectors, as reflected in the synthesized connector, into a unified synthesized content item.

In some embodiments, and as illustrated in FIG. 2, the synthesized connector management system 120 associates the synthesized content item 230 with a synthesized ACL 236. The synthesized ACL 236 is an example of a synthesized access control mechanism generated by the synthesized connector management system 120 based on account-level application connectors. As mentioned, the synthesized connector management system 120 generates a synthesized connector that defines access control for user accounts. The synthesized connector management system 120 can associate the defined access control with the synthesized content item 230 to indicate which users are authorized to access the synthesized content item 230. For instance, the synthesized connector management system 120 generates the synthesized ACL 236 that lists users and user accounts that have access to the synthesized content item 230. More specifically, the synthesized connector management system 120 utilizes data from the set of content items 228 and the account-level application connectors 202 to determine which users and/or user accounts to include within the synthesized ACL 236.

As illustrated in FIG. 2, the synthesized connector management system 120 updates a search index 206 to include a synthesized content item. More specifically, the synthesized connector management system 120 can update a search engine 208 to include the synthesized content item 230. The synthesized content item 230 includes reference to the content item identifier as well as the access control mechanism. In some implementations, the search engine 208 comprises a search engine capable of full-text search and real-time data analysis.

As mentioned, the synthesized connector management system 120 can utilize the search index 206 to perform accurate and efficient searches. FIG. 2 illustrates an overview of the synthesized connector management system 120 executing a search in accordance with one or more implementations of the present disclosure. In some embodiments, the synthesized connector management system 120 utilizes any type of data repository in place of the search index 206. For example, the synthesized connector management system 120 can utilize file-based repositories, relational databases, machine learning feature stores, data warehouses, and other types of data repositories.

As shown in FIG. 2, the synthesized connector management system 120 receives a search request 214 from a client device associated with a user account 222 of the set of user accounts 224. For example, and as shown in FIG. 2, the search request 214 comprises a request to access the synthesized content item 230. Based on receiving the search request 214, the synthesized connector management system 120 identifies the synthesized content item 230 within the search index 206 based on a content item identifier or a synthesized content item identifier. The synthesized connector management system 120 can verify that the user account 222 has permission to access the synthesized content item 230 based on the associated access control mechanism. For instance, the synthesized connector management system 120 verifies that the user account 222 is included in an access control list. For example, the synthesized connector management system 120 can include a query clause for the ACL field in the search index 206 containing the user account that issued the query. Based on determining that the defined access control permits access by the user account 222, the synthesized connector management system 120 can provide, for display via a client device associated with the user account 222, the synthesized content item 230.

In some implementations, the synthesized connector management system 120 performs an optional postfiltering 212 step to verify that the user account 222 has access to the content item from which the synthesized content item 230 originates. Because the synthesized content item 230 and the corresponding access control mechanism is generated by the synthesized connector management system 120 and not the third-party system, the access control mechanism may not be completely up-to-date or in sync with the third-party system. By performing postfiltering 212, the synthesized connector management system 120 can confirm whether an account-level application connector for a content item underlying the synthesized content item exists for the user account 222.

In some embodiments, and as illustrated in FIG. 2, the synthesized connector management system 120 performs the postfiltering 212 step by utilizing a permission service 232. The permission service 232 comprises a system used to determine whether a user has the right to perform a specific action on a content item based on access control rules from a third-party system. For example, the permission service 232 may include a permissions Application Programming Interface (API) 234. The permissions API 234 is a programming interface that enables the synthesized connector management system 120 to access control rules for external content data. In some examples, the synthesized connector management system 120 utilizes the permissions API 234 to check whether the user account 222 has access to a content item based on the content item identifier. For instance, the synthesized connector management system 120 can input, into the permissions API 234, the content item identifier for the content item underlying the synthesized content item 230. The synthesized connector management system 120 utilizes the permissions API 234 to confirm that the user account 222 still has an authorized account-level application connector. In some examples, the existence of an account-level application connector for a content item serves as proof of permissible access by the user account 222 to a content item. Based on determining that (i) the defined access control (e.g., the access control mechanism or an ACL) permits access by the user account 222 and (ii) verifying that the account-level application connector exists, the synthesized connector management system 120 can determine to provide access to the synthesized content item 230 by the user account 222.

As shown in FIG. 2, the synthesized connector management system 120 can further access account-level application connector data via a connectors persistence 220 layer. The synthesized connector management system 120 uses the connectors persistence 220 to store data regarding the account-level application connectors 202 accessed previously from within the third-party system. For example, in some implementations, the connectors persistence 220 stores a third-party access control mechanism. More specifically, the third-party access control mechanism indicates access control to a content item as defined by the third-party system. In some embodiments, the synthesized connector management system 120 utilizes the permissions API to access the third-party access control mechanism to confirm, using third-party system data, that the user account 222 has access to a particular content item.

As mentioned, the synthesized connector management system 120 can utilize a connection resolver 216 to determine which synthesized connection (from the synthesized connections database 218) should be accessed to retrieve the requested content item. In particular, the synthesized connector management system 120 can utilize the connection resolver 216 to identify the appropriate synthetic connection corresponding with a content item identifier. In some implementations, the synthesized connector management system 120 utilizes the connection resolver 216 to prioritize certain synthetic connectors over others or resolve conflicts when multiple synthetic connectors link to the same synthetic content item. For instance, the connection resolver 216 can determine which synthetic connectors link to the most recent version of a synthetic content item.

As mentioned, the synthesized connector management system 120 can deduplicate content items or portions of content items to generate an aggregated synthesized content item. FIG. 3 illustrates a synthesized connector management system deduplicating content items or portions of content items to generate an aggregated synthesized content item in accordance with one or more embodiments. FIG. 3 illustrates a group 304 of user accounts 302*a*-302*c*. Each of the user accounts 302*a*-302*c* is linked, via account-level application connectors to content items 306*a*-306*c*. The content items 306*a*-306*c* are associated with content item identifiers. As mentioned, a content item identifier comprise a unique identifier assigned to a specific content item within a third-party system. The content item identifier serves as a reference that allows the synthesized connector management system 120 to retrieve, update, or track the content items 306*a*-306*c*.

FIG. 3 illustrates the content items 306*a*-306*c*. As shown, content items 306*a*-306*b*, accessible to user accounts 302*a*-320*b*, respectively, are identical in their entirety. As further shown in FIG. 3, the content item 306*c* is different than the content items 306*a*-306*b*. The synthesized connector management system 120 identifies matching portions 308 that are shared among the content items 306*a*-306*c* as well as different portions. For example, the synthesized connector management system 120 might determine that the user account 302*c* has been granted access to only the matching portions 308 of a content item. As discussed below in additional detail, the synthesized connector management system 120 can generate a synthesized content item by deduplicating content data included in a set of content items. More specifically, the synthesized connector management system 120 can deduplicate (i) entire content items or (ii) matching portions 308 of content items to generate a synthesized content item.

As mentioned, and as illustrated in FIG. 3, the synthesized connector management system 120 can deduplicate entire content items to generate a synthesized content item 310. The synthesized connector management system 120 can determine that the content item identifiers corresponding with the content items 306*a*-306*b* are the same. Furthermore, the synthesized connector management system 120 determines that the content items 306*a*-306*b* are identical. Based on this determination, the synthesized connector management system 120 determines to store a single synthesized content item 310 instead of storing each of the content item 306*a* and the content item 306*b*. Accordingly, the synthesized connector management system 120 generates a virtual copy of the content items 306*a*-306*b* in the form of the synthesized content item 310.

As shown in FIG. 3, the synthesized connector management system 120 associates a content item identifier and also defines access control for the synthesized content item 310. In some implementations, the access control is defined using an access control mechanism, such as an access control list (ACL). In some examples, the synthesized connector management system 120 adds the user account 302*a* and the user account 302*b* to the ACL. Thus, during retrieval, the synthesized connector management system 120 can efficiently determine that both the user account 302*a* and the user account 302*b* have permission to access the synthesized content item 310.

As mentioned previously, the synthesized connector management system 120 can also generate a synthesized content item based on matching portions of content items. More particularly, when the synthesized connector management system 120 ingests the content item 306*c*, the synthesized connector management system 120 can determine that the user account 302*c* has access to only the matching portions 308 of the content item. Accordingly, the synthesized connector management system 120 can construct a synthesized content item 312 comprising a matching portion 314 shared between the content items 306*a*-306*c*. In this example, when creating the synthesized content item 312, the synthesized connector management system 120 updates the access control to provide access to each of the user accounts 302*a*-302*c*.

In one example, the synthesized connector management system 120 might determine that different user accounts have different permissions to access the same content item. To illustrate, the content items 306*a*-306*c* might represent a tabular data structure. The user account 302*a* and the user account 302*b* may have access to the whole tabular data structure while the user account 302*c* and additional users within the group 304 have access to specific sheets or columns within the tabular data structure. Accordingly, the synthesized connector management system 120 can generate, for the user account 302*c* and the additional users within the group 304, the synthesized content item 312 that contains the authorized sheets or columns accessible by the user account 302 and the additional users.

Figure 4:
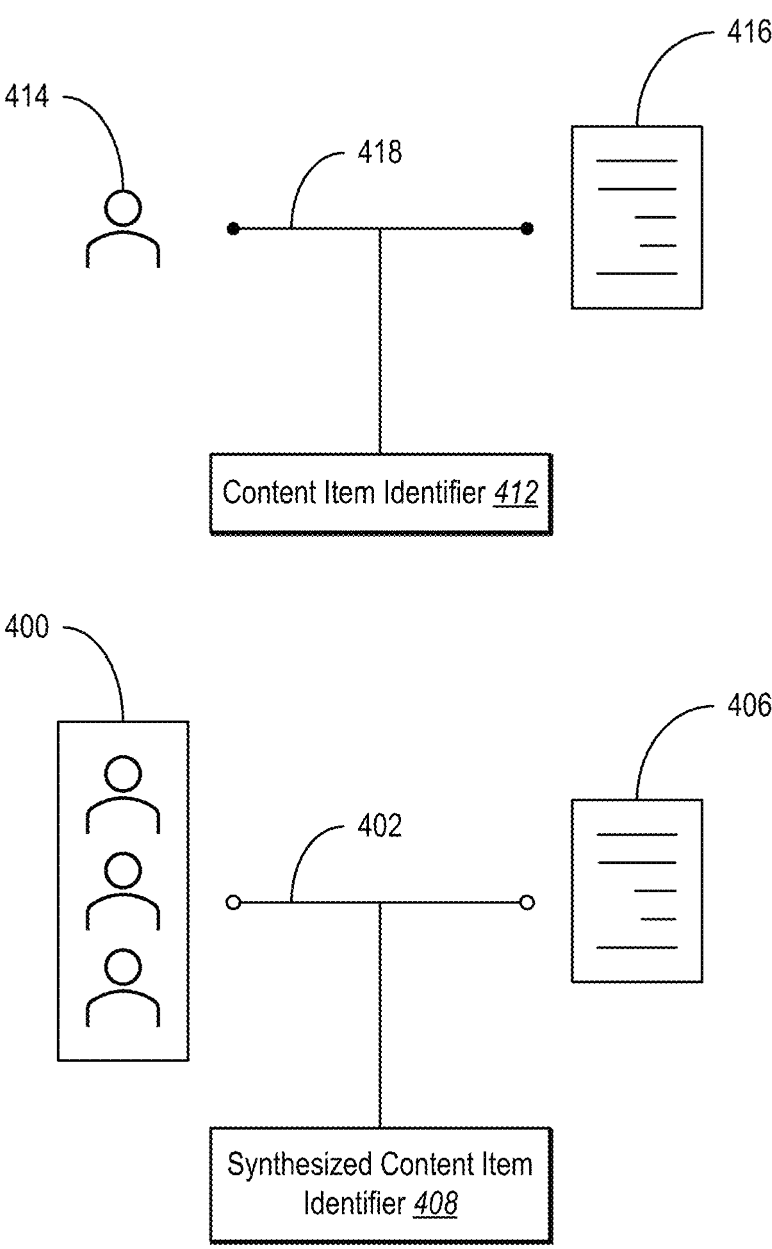
FIG. 4 illustrates the synthesized connector management system generating and using content item identifiers to in accordance with one or more embodiments of the present disclosure.

As discussed, the synthesized connector management system 120 can use content item identifiers to identify a set of account-level application connectors linked to the same content item. Additionally, the synthesized connector management system 120 can generate a synthesized content item identifier used in accessing synthesized content items. FIG. 4 illustrates the synthesized connector management system 120 generating and using content item identifiers to in accordance with one or more embodiments of the present disclosure.

As described previously, the synthesized connector management system 120 uses content item identifiers to retrieve specific content items from third-party systems via application-level connectors. FIG. 4 illustrates an account-level application connector 418 of an individual connector type for a user account 414 enabling the synthesized connector management system 120 to ingest a content item 416. The user account 414 and the account-level application connector 418 are associated with a content item identifier 412. The content item identifier 412 comprises a unique reference that precisely identifies the target content item in the third-party system. More specifically, the content item identifier 412 is assigned by the third-party system. For example, the content item identifier 412 may comprise an ID, URL, content key, or other type of reference used within the third-party system.

In some implementations, the synthesized connector management system 120 ingests the user account 416 by querying the third-party system using the content item identifier 412. In particular, the synthesized connector management system 120 can initialize the account-level application connector 418. The synthesized connector management system 120 further uses the content item identifier 412 to query the third-party system for the user account 416. The third-party system responds with the full content item including metadata (e.g., title, author, timestamps) and the content item 416 itself.

FIG. 4 further illustrates a synthesized connector 402 providing access to a synthesized content item 406 for a set of user accounts 400. Like how the synthesized connector management system 120 queries a third-party system to retrieve a content item using the content item identifier 412, the synthesized connector management system 120 uses a synthesized content item identifier 408 to access and retrieve a synthesized content item 406 via a synthesized connector 402 from within a search index. More specifically, when the synthesized connector management system 120 generates the synthesized connector and the synthesized content item, the synthesized connector management system 120 associates the content item identifier 412 to the synthesized connector and/or the synthesized content item. For example, the synthesized connector management system 120 assigns, to a synthesized connector 402, a synthesized content item identifier 408.

In some embodiments, the synthesized connector management system 120 generates the synthesized content item identifier 408 based on the content item identifier 412. For example, the synthesized connector management system 120 adopts the content item identifier 412 as the synthesized content item identifier 408. To illustrate, when generating the synthesized connector 402, the synthesized connector management system 120 can utilize the content item identifier 412 as the synthesized content item identifier 408 to identify the synthesized connector 402 and the synthesized content item 406.

In some embodiments, and as illustrated in FIG. 4, the synthesized connector management system 120 generates a unique synthesized content item identifier 408 that is different than the content item identifier 412. For instance, the synthesized connector management system 120 can generate a synthesized content item identifier 408 comprising a combination of the content item identifier 412 and an additional reference. To illustrate, the synthesized connector management system 120 can use the additional reference to accurately track and manage different versions of a content item. More specifically, the additional reference can capture the state or version of the content item at a specific point in time or as accessed by certain user accounts. By using the additional reference, the synthesized connector management system 120 can detect whether the content item has changed since it was last ingested, enabling efficient version control, incremental updates, and cache validation. Examples of additional references used as part of the synthesized content item identifier 408 can include a version ID, timestamp, ETag, content hash, and other references.

In some implementations, the synthesized connector management system 120 can generate the synthesized content item identifier 408 to comprises a hierarchical representation of the content item identifier 412. For example, the synthesized connector management system 120 can generate a structured identifier or path that reflects the position of the synthesized content item 406 within a data structure. The synthesized connector management system 120 can further use the hierarchical representation to enabled structured access and organization and further support content item versioning.

As mentioned previously, the synthesized connector management system 120 can update the search index with updated synthesized content items. FIG. 5 illustrates the synthesized connector management system 120 updating a search index with an updated synthesized content item in accordance with one or more embodiments of the present disclosure.

FIG. 5 illustrates the synthesized connector management system 120 performing an act 502 of detecting a change. In particular, the synthesized connector management system 120 can detect a change to a content item in a third-party system 514 by identifying discrepancies between content items and synthesized content items or by identifying discrepancies between account-level application connectors and synthesized connectors. In some examples, the synthesized connector management system 120 detects a change in a content item in a third-party system 514 by periodically querying the third-party system for content and content metadata using the content item identifier. More specifically, the synthesized connector management system 120 selects random account-level application connectors within a connectors persistence model (e.g., the connectors persistence 220 illustrated in FIG. 2). The connectors persistence layer stores raw content items and metadata retrieved directly from the third-party system. To maintain consistency with the third-party system, the synthesized connector management system 120 can check for discrepancies in identifiers, version markers, or other data associated with content items between data within the connectors persistence layer and the search index. More specifically, the synthesized connector management system 120 compares data for the content item within the third-party system 514 with the synthesized content item within the content management system 516.

The synthesized connector management system 120 detects different types of changes to the content item within the third-party system. In particular, the synthesized connector management system 120 detects changes to the content of a content item. For instance, the synthesized connector management system 120 can detect body content modifications (e.g., text updates, image updates, etc.), hash changes (e.g., changes in content hashes indicating different versions), version increments, and other content changes. The synthesized connector management system 120 further detects metadata changes. To illustrate, the synthesized connector management system 120 detects changes to the title or name, description or summary, labels, modification date/time changes, and other metadata changes. Additionally, the synthesized connector management system 120 can detect permission or access changes. For instance, the synthesized connector management system 120 can detect whether new users or groups have been granted access, access revoked for certain users, visibility scope changes, role or access level changes, and other access changes. Furthermore, the synthesized connector management system 120 can detect structural or organizational changes. To illustrate, the synthesized connector management system 120 can detect whether a content item has been moved to a different location (e.g., folder, project, parent item, etc.), renamed folder path or hierarchy change, if the content item was deleted or restored, a change in ownership, or other organizational changes. Additionally, the synthesized connector management system 120 can detect system-level changes such as a content type or format change (e.g., from .docx to .pdf), status updates (e.g., from draft to published, or from active to archived).

In some embodiments, based on detecting more than a threshold number of changes, the synthesized connector management system 120 can determine to batch updates. In particular, when the synthesized connector management system 120 monitors for updates and detects that a number of changes has exceeded a predefined batch threshold within a predetermined period of time, the synthesized connector management system 120 may trigger a batch update operation to efficiently persist those updates. To illustrate, instead of writing each update individually, which can be resource-intensive, the synthesized connector management system 120 accumulates changes in memory or a staging area. Once the change count surpasses the batch threshold (e.g., 50, 100, 150, etc. changes), the synthesized connector management system 120 initiates a bulk save, committing the batch to the synthesized connector and the synthesized content item in a single operation. Utilizing the batch save operation enables the synthesized connector management system 120 to reduce overhead from frequent updating operations, improves throughput, and ensures better consistency across related updates. For instance, the synthesized connector management system 120 might determine to initiate a batch update operation based on detecting that a number of users granted access to a content item within a predetermined period of time exceeds a predefined batch threshold.

In some embodiments, instead of synchronizing with the third-party system based on a detected change, the synthesized connector management system 120 performs a forceful sync to re-fetch all content items from a third-party system. The synthesized connector management system 120 can determine a synchronization interval (e.g., 30 days, 60 days, 90 days, etc.) at which to ensure that the synthesized connector management system 120 maintains a state that matches the third-party system exactly.

As further illustrated in FIG. 5, the synthesized connector management system 120 can perform an act 506 of generating an updated synthesized connector. When the synthesized connector management system 120 detects discrepancies between the set of account-level application connectors and the synthesized connector, the synthesized connector management system 120 updates the synthesized connector to reflect the most accurate and up-to-date representation of the shared content item. More particularly, the synthesized connector management system 120 can generate an updated synthesized connector 520 based on the various types of changes detected to the set of account-level application connectors 518 associated with the synthesized connector.

The synthesized connector management system 120 generates the updated synthesized connector 520 based on detected permission or access changes. In some embodiments, the synthesized connector management system 120 can remove particular user accounts from an access control mechanism (e.g., an ACL 526 associated with the updated synthesized connector 520) based on determining that the particular user accounts no longer have access to the latest changes to a content item. For example, the synthesized connector management system 120 detects that a user account **522*a* continues to receive updates to a content item through account-level application connector 518*a* but that a user account 522*b*** has stopped receiving updates to the same content item through account-level application connector 518*b*. Based on this determination, the synthesized connector management system 120 removes the user account 522*b* from the access control mechanism (e.g., the ACL 526). In some embodiments, the synthesized connector management system 120 can remove the user account 522*b* from the ACL 526 immediately or after a set amount of time.

In some implementations, the synthesized connector management system 120 identifies a new user account that has been granted access to a content item. For example, the user account 522*b* may comprise a user account that has been newly granted access to a content item. In response, the synthesized connector management system 120 can simply update the ACL 526 to include the user account 522*b*. Thus, the synthesized connector management system 120 can simply generate the updated synthesized connector 520, by updating the ACL 526 to include or exclude certain user accounts. More specifically, the synthesized connector management system 120 can grant new users access to a synthetic content item linked to the updated synthesized connector 520 based on detecting that new users have gained access to underlying content items. Similarly, the synthesized connector management system 120 can remove user accounts based on determining that those user accounts have timed out permissions or have otherwise been removed from a given content item.

In another example, the synthesized connector management system 120 determines to delete a synthesized connector and the corresponding synthesized content item based on removing all user accounts from the ACL 526. Since the ACL 526, or another access control mechanism, represents the set of users authorized to access the synthesized content, the synthesized connector management system 120 determines than an empty ACL indicates that the content is no longer visible or relevant to any active users. In this case, the synthesized connector management system 120 treats the synthesized content item and the synthesized connector as obsolete and removes it from storage and indexing to conserve resources and maintain a clean, efficient dataset.

The synthesized connector management system 120 can generate an updated synthesized connector based on detecting content changes. When the synthesized connector management system 120 detects content changes, such as changes to the content item's body, structure, or actual data, the synthesized connector management system 120 can update the synthesized content item identifier 524 to reflect an updated version.

As shown in FIG. 5, the synthesized connector management system 120 performs an act 510 of updating a synthesized connector database. In particular, the synthesized connector management system 120 adds the updated synthesized connector 520 to the synthesized connector database (e.g., the synthesized connections database 218 illustrated in FIG. 2). In some embodiments, the synthesized connector management system 120 simply updates existing synthetic connectors. For example, the synthesized connector management system 120 can update an ACL for an existing synthetic connector within the synthesized connector database by adding or removing a user account. The synthesized connector management system 120 can further update the synthesized connector database by removing a synthesized connector. For instance, if the synthesized connector management system 120 has determined to remove all user accounts from the ACL 526, the synthesized connector management system 120 can remove a synthesized connector from the synthesized connector database. Furthermore, in some implementations, the synthesized connector management system 120 simply adds an updated synthesized connector to the synthesized connector database.

As illustrated in FIG. 5, the synthesized connector management system 120 can perform an act 508 of generating an updated synthesized content item. The synthesized connector management system 120 generates, through the updated synthesized connector, an updated synthesized content item. The updated synthesized content item includes changes to content, metadata, and version ID as detected by the synthesized connector management system 120. More specifically, the synthesized connector management system 120 refreshes the stored representation of the synthesized content item to keep the synthesized content item consistent with the underlying source content items and ensures that users accessing the synthesized content item through the synthesized connector access the most up-to-date version based on the underlying content items.

FIG. 5 further illustrates the synthesized connector management system 120 performing an act 512 of updating a search index. In particular, the synthesized connector management system 120 updates the search index to include the updated synthesized content item. In some implementations, the synthesized connector management system 120 reindexes the updated synthesized content item to reflect its latest metadata and content. The updated synthesized content item may include new keywords, modified titles, or revised descriptions, all of which impact how the synthesized content item is ranked and retrieved during queries. Additionally, the synthesized connector management system 120 may update term frequencies and document relevance scores to account for changes. Furthermore, if access permissions have shifted, the synthesized connector management system 120 updates the search index to adjust visibility filters to ensure that only authorized users can discover the updated synthesized content items. Through this process, the synthesized connector management system 120 maintains the integrity of search results and ensures that users see the most current and accurate information. In some embodiments, the synthesized connector management system 120 updates any other type of data repository that the synthesized connector management system 120 utilizes.

FIGS. 1-5, the corresponding text, and the examples provide a number of different systems and methods for updating a search index to include a synthesized content item based on a synthesized connector in accordance with one or more embodiments. In addition to the foregoing, implementations can also be described in terms of flowcharts comprising acts steps in a method for accomplishing a particular result. For example, FIG. 6 illustrates an example series of acts for generating a synthesized content item and updating a search index to include the synthesized content item in accordance with one or more embodiments of the present disclosure.

Figure 6:
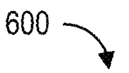
FIG. 6 illustrates a flowchart of a series of acts for generating a synthesized content item and updating a search index to include the synthesized content item in accordance with one or more embodiments.
Figure 6:
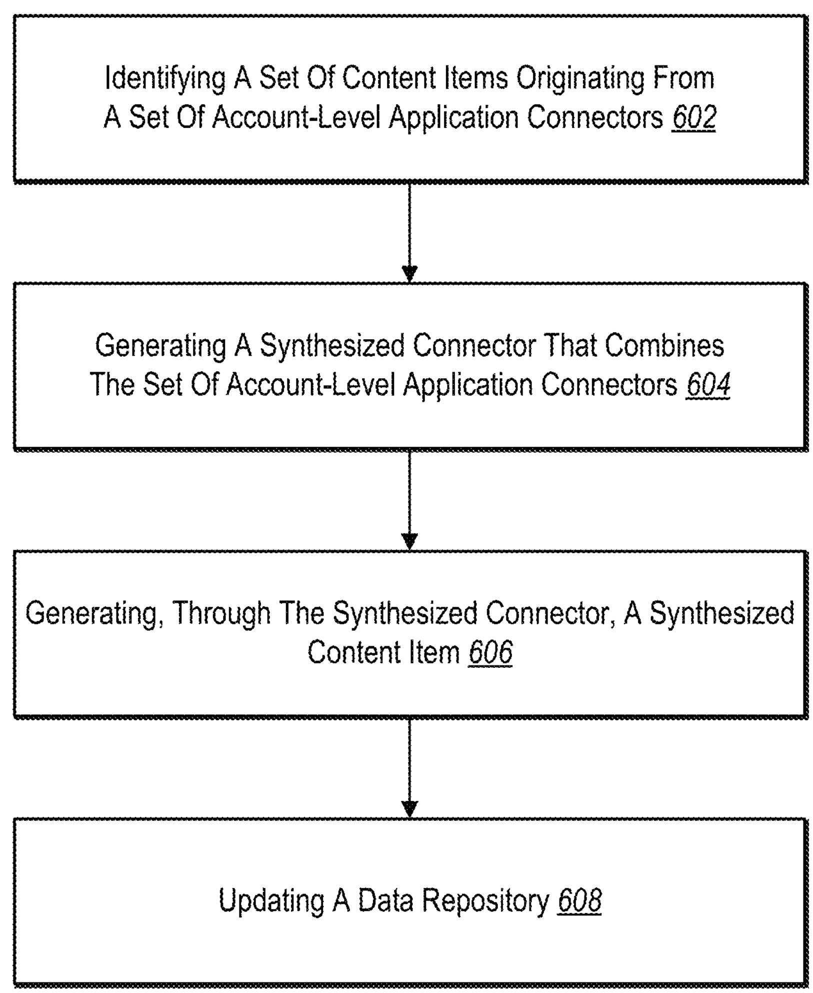

As illustrated in FIG. 6, the series of acts 600 may include an act 602 of identifying a set of content items originating from a set of account-level application connectors. For example, in one or more embodiments, the act 602 can include identifying, from a plurality of content items ingested into a content management system through account-level application connectors, a set of content items originating from a set of account-level application connectors of an individual connector type. In addition, the series of acts 600 includes an act 604 of generating a synthesized connector that combines the set of account-level application connectors. In one or more implementations, the act 604 includes generating a synthesized connector that combines the set of account-level application connectors into a single data ingestion path that defines access control for user accounts associated with the account-level application connectors. The series of acts 600 illustrated in FIG. 6 further includes an act 606 of generating, through the synthesized connector, a synthesized content item. In some embodiments, the act 606 can include generating, through the synthesized connector, a synthesized content item by deduplicating content data included in the set of content items. Furthermore, FIG. 6 illustrates an act 608 of updating a data repository. In some examples, the act 608 comprises updating a data repository to include the synthesized content item and the defined access control.

In some implementations, the series of acts 600 includes defining the access control by generating an access control list comprising user accounts associated with the account-level application connectors.

In some implementations, the data repository comprises a search index.

Further, in one or more embodiments, the series of acts 600 includes generating the synthesized connector by combining a first type of account-level application connectors and a second type of account-level application connectors.

In one or more examples, the series of acts 600 includes receiving, from client device associated with a user account of the user accounts, a request to access the synthesized content item; accessing, based on identifying the synthesized content item within the data repository, the synthesized connector; determining, based on the synthesized connector, that the defined access control permits access by the user account; verifying, that an account-level application connector for the synthesized content item exists for the user account; and providing, for display via the client device, the content item.

In one or more implementations, the series of acts 600 includes determining that the set of content items comprise content items having matching portions and different portions; and generating, through the synthesized connector, the synthesized content item comprising the matching portions.

In one or more embodiments, the series of acts 600 includes determining that a number of user accounts identified by the access control falls below a threshold value; and based on determining that the number of user accounts falls below the threshold value, removing the synthesized content item. More specifically, in some implementations, the series of acts 600 includes determining that a number of user accounts identified by the access control equals zero; and based on determining that the number of user accounts equals zero, removing the synthesized content item from the data repository.

In some embodiments, the series of acts 600 includes determining a synchronization interval; generating an updated synthesized connector based on the account-level application connectors; generating, through the updated synthesized connector, an updated synthesized content item; and updating the data repository to include the updated synthesized content item.

Additionally, in some embodiments, the series of acts 600 includes identifying, from the plurality of content items, a subset of updated content items originating from a subset of account-level application connectors and a second subset of unchanged content items originating from a second subset of account-level application connectors; and generating an updated synthesized connector that includes the subset of account-level application connectors and excludes the second subset of account-level application connectors.

In one or more implementations, each of the components of the synthesized connector management system 120 are in communication with one another using any suitable communication technologies. Additionally, the components of the synthesized connector management system 120 can be in communication with one or more other devices including one or more client devices described above. It will be recognized that in as much the synthesized connector management system 120 is shown to be separate in the above description, any of the subcomponents may be combined into fewer components, such as into a single component, or divided into more components as may serve a particular implementation.

Figure 7:
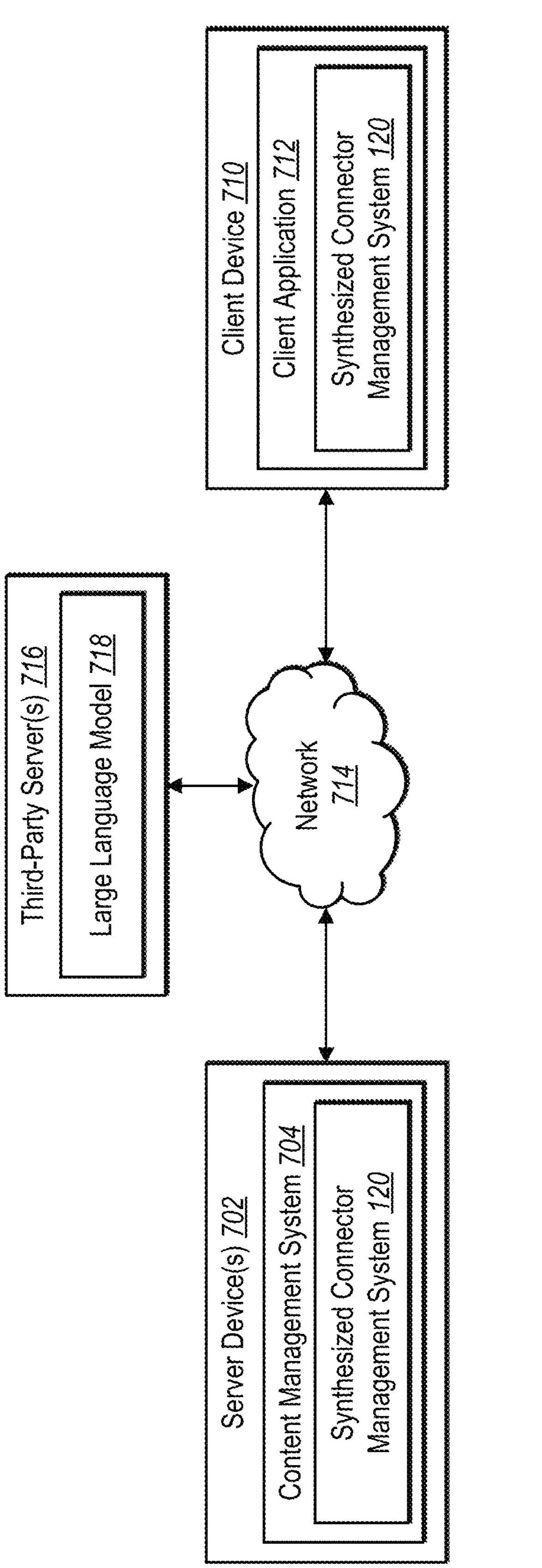
FIG. 7 illustrates an example environment within which a synthesized connector management system can operate in accordance with one or more embodiments.

Additional detail regarding the connector management system will now be provided with reference to the figures. For example, FIG. 7 illustrates a schematic diagram of an example system environment for implementing a synthesized connector management system 120 in accordance with one or more implementations. An overview of the synthesized connector management system 120 is described in relation to FIG. 7.

As shown, the environment includes server(s) 702, a client device 710, third-party server(s) 716, and a network 714. Each of the components of the environment can communicate via the network 714, and the network 714 may be any suitable network over which computing devices can communicate. Example networks are discussed in more detail below in relation to FIGS. 8-9.

As mentioned above, the example environment includes a client device 710. The client device 710 can be one of a variety of computing devices, including a smartphone, a tablet, a smart television, a desktop computer, a laptop computer, a virtual reality device, an augmented reality device, or another computing device as described in relation to FIGS. 8-9. The client device 710 can communicate with the server(s) 702 via the network 714. For example, the client device 710 can receive user input from a user interacting with the client device 710 (e.g., via the client application 712 or the third-party application 718) to, for instance, access, navigate, download, link, or share a data from a third-party application 718 within the third-party server(s) 716, to search for one or more content items or to select a selectable connector suggestion. In addition, the synthesized connector management system 120 on the server(s) 702 can receive information relating to various interactions with user interface elements based on the input received by the client device 710 (e.g., to search for one or more content items from the third-party application in the third-party server(s) 716 and the content management system 704).

As shown, the client device 710 can include a client application 712. In particular, the client application 712 may be a web application, a native application installed on the client device 710 (e.g., a mobile application, a desktop application, etc.), or a cloud-based application where all or part of the functionality is performed by the server(s) 702. Based on instructions from the client application 712, the client device 710 can present or display information, including a search result with one or more content items stored or associated with third-party applications.

As illustrated in FIG. 7, the example environment also includes the server(s) 702. The server(s) 702 may generate, track, store, process, receive, search, communicatively link, and transmit electronic data, such as digital content (e.g., content items), datasets, searchable data, pages of data, prompts, interface elements, searches, browsing activity, browsing data, interactions with interface elements, interactions with selectable connector suggestions, and/or interactions between user accounts or client devices. For example, the server(s) 702 may receive data from the client device 710 in the form of a search for a content item or one or more content items related to a topic from a third-party application 718 external to the content management system 704. In addition, the server(s) 702 can transmit data to the client device 710 in the form of a search result with one or more content items associated with the third-party application 718 that is linked to the content management system 704. In some cases, the server(s) 702 can transmit a selectable connector suggestion to link the third-party application 718 with the content management system 704. Indeed, the server (s) 702 can communicate with the client device 710 to send and/or receive data via the network 714. In some implementations, the server(s) 702 comprise(s) a distributed server where the server(s) 702 include(s) a number of server devices distributed across the network 714 and located in different physical locations. The server(s) 702 can comprise one or more content servers, application servers, communication servers, web-hosting servers, machine learning server, and other types of servers.

As shown in FIG. 7, the server(s) 702 can also include the synthesized connector management system 120 as part of a content management system 704. The content management system 704 can communicate with the client device 710 to perform various functions associated with the client application 712 such as searching a linked third-party application 718, identifying the third-party application 718 based on browsing data, and/or generating a digital connection between the third-party application 718 and a user account on the content management system 704. Indeed, the content management system 704 can include a network-based smart cloud storage system to manage, store, synchronize, and maintain content items associated with user accounts within the content management system and link the content management system 704 to third-party applications external to the content management system 704. In some embodiments, synthesized connector management system 120 and/or the content management system 704 utilize a database to store and access the content items associated with the third-party application 718.

FIG. 7 further illustrates a third-party server(s) 716. In particular, the third-party server(s) 716 can host or house a third-party application 718 that includes or that searches or generates (as part of its native application functions) one or more content items. For example, the third-party server(s) 716 can include a server location hosting the third-party application 718 that is external to the synthesized connector management system 120 and the content management system 704. In some cases, the third-party server(s) 716 is external to the synthesized connector management system 120, but the synthesized connector management system 120 can nevertheless access the third-party application 718 via one or more, connectors, plugins, APIs, or other network-based access protocols.

Although FIG. 7 depicts the synthesized connector management system 120 located on the server(s) 702, in some implementations, the synthesized connector management system 120 may be implemented by (e.g., located entirely or in part on) one or more other components of the environment. For example, the synthesized connector management system 120 may be implemented by the client device 710 and/or a third-party device. For example, the client device 710 can download all or part of the synthesized connector management system 120 for implementation independent of, or together with, the server(s) 702.

In some implementations, though not illustrated in FIG. 7, the environment may have a different arrangement of components and/or may have a different number or set of components altogether. For example, the client device 710 may communicate directly with the synthesized connector management system 120 bypassing the network 714. As another example, the environment can include a database located external to the server(s) 702 (e.g., in communication via the network 714) or located on the server(s) 702, on a third-party server(s) 716, and/or on the client device 710.

Figure 8:
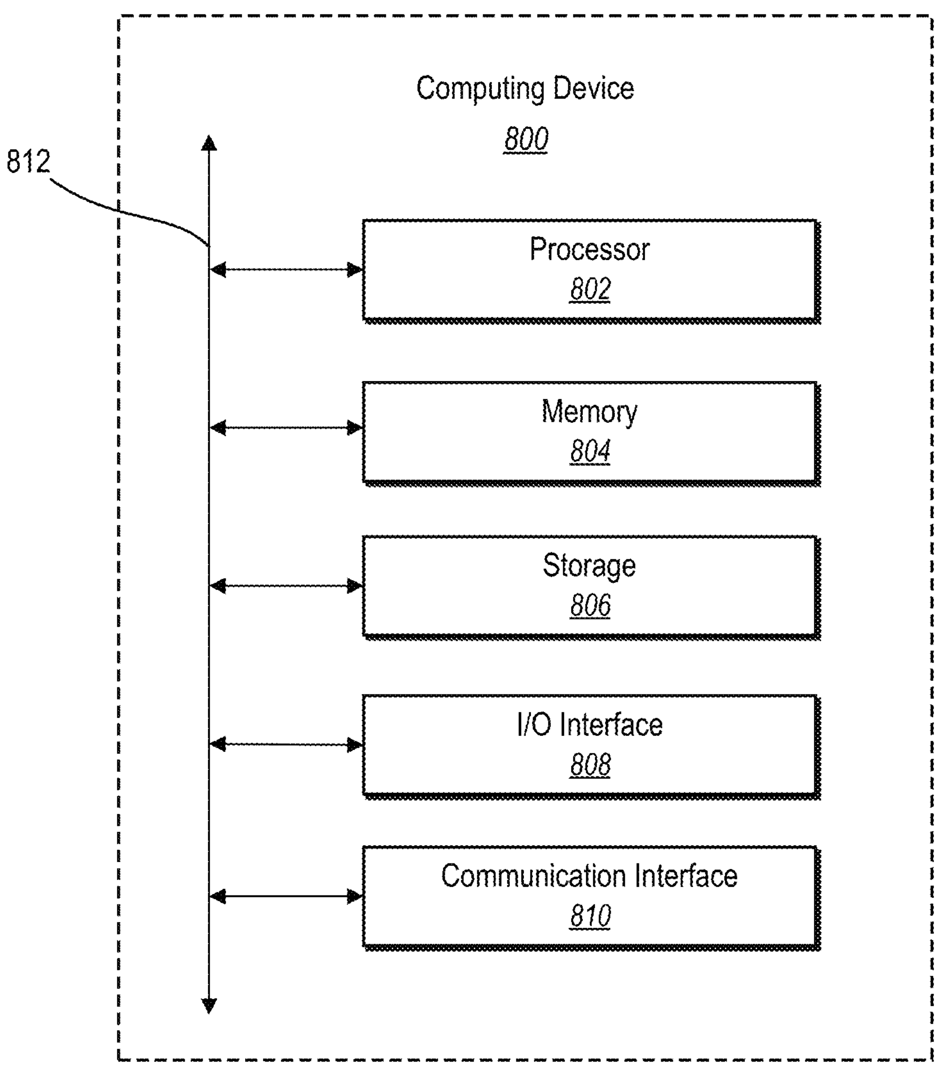
FIG. 8 illustrates a block diagram of an exemplary computing device in accordance with one or more embodiments.

FIG. 8 illustrates a block diagram of exemplary computing device 800 that may be configured to perform one or more of the processes described above. The components of the synthesized connector management system 120 can include software, hardware, or both. For example, the components of the synthesized connector management system 120 can include one or more instructions stored on a computer-readable storage medium and executable by processors of one or more computing devices (e.g., the computing device 800). When executed by the one or more processors, the computer-executable instructions of the synthesized connector management system 120 can cause the computing device 800 to perform the methods described herein. Alternatively, the components of the synthesized connector management system 120 can comprise hardware, such as a special purpose processing device to perform a certain function or group of functions. Additionally, or alternatively, the components of the synthesized connector management system 120 can include a combination of computer-executable instructions and hardware.

Furthermore, the components of the synthesized connector management system 120 performing the functions described herein may, for example, be implemented as part of a stand-alone application, as a module of an application, as a plug-in for applications including content management applications, as a library function or functions that may be called by other applications, and/or as a cloud-computing model. Thus, the components of the synthesized connector management system 120 may be implemented as part of a stand-alone application on a personal computing device or a mobile device.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

As mentioned, FIG. 8 illustrates a block diagram of exemplary computing device 800 that may be configured to perform one or more of the processes described above. One will appreciate that third-party server(s) 702, the client device 710, and/or the computing device 800 may comprise one or more computing devices such as computing device 800. As shown by FIG. 8, computing device 800 can comprise processor 802, memory 804, a storage device, a I/O interface, and communication interface 810, which may be communicatively coupled by way of communication infrastructure 812. While an exemplary computing device 800 is shown in FIG. 8, the components illustrated in FIG. 8 are not intended to be limiting. Additional or alternative components may be used in other implementations. Furthermore, in certain implementations, computing device 800 can include fewer components than those shown in FIG. 8. Components of computing device 800 shown in FIG. 8 will now be described in additional detail.

In particular implementations, processor 802 includes hardware for executing instructions, such as those making up a computer program. As an example, and not by way of limitation, to execute instructions, processor 802 may retrieve (or fetch) the instructions from an internal register, an internal cache, memory 804, or storage device 806 and decode and execute them. In particular implementations, processor 802 may include one or more internal caches for data, instructions, or addresses. As an example, and not by way of limitation, processor 802 may include one or more instruction caches, one or more data caches, and one or more translation lookaside buffers (TLBs). Instructions in the instruction caches may be copies of instructions in memory 804 or storage device 806.

Memory 804 may be used for storing data, metadata, and programs for execution by the processor(s). Memory 804 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. Memory 804 may be internal or distributed memory.

Storage device 806 includes storage for storing data or instructions. As an example, and not by way of limitation, storage device 806 can comprise a non-transitory storage medium described above. Storage device 806 may include a hard disk drive (HDD), a floppy disk drive, flash memory, an optical disc, a magneto-optical disc, magnetic tape, or a Universal Serial Bus (USB) drive or a combination of two or more of these. Storage device 806 may include removable or non-removable (or fixed) media, where appropriate. Storage device 806 may be internal or external to computing device 800. In particular implementations, storage device 806 is non-volatile, solid-state memory. In other implementations, Storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 808 allows a user to provide input to, receive output from, and otherwise transfer data to and receive data from computing device 800. I/O interface 808 may include a mouse, a keypad or a keyboard, a touch screen, a camera, an optical scanner, network interface, modem, other known I/O devices or a combination of such I/O interfaces. I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 808 is configured to provide graphical data to a display for presentation to a user. The graphical data may be representative of one or more graphical interfaces and/or any other graphical content as may serve a particular implementation.

Communication interface 810 can include hardware, software, or both. In any event, communication interface 810 can provide one or more interfaces for communication (such as, for example, packet-based communication) between computing device 800 and one or more other computing devices or networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 812 may include hardware, software, or both that couples components of computing device 800 to each other. As an example and not by way of limitation, communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 9:
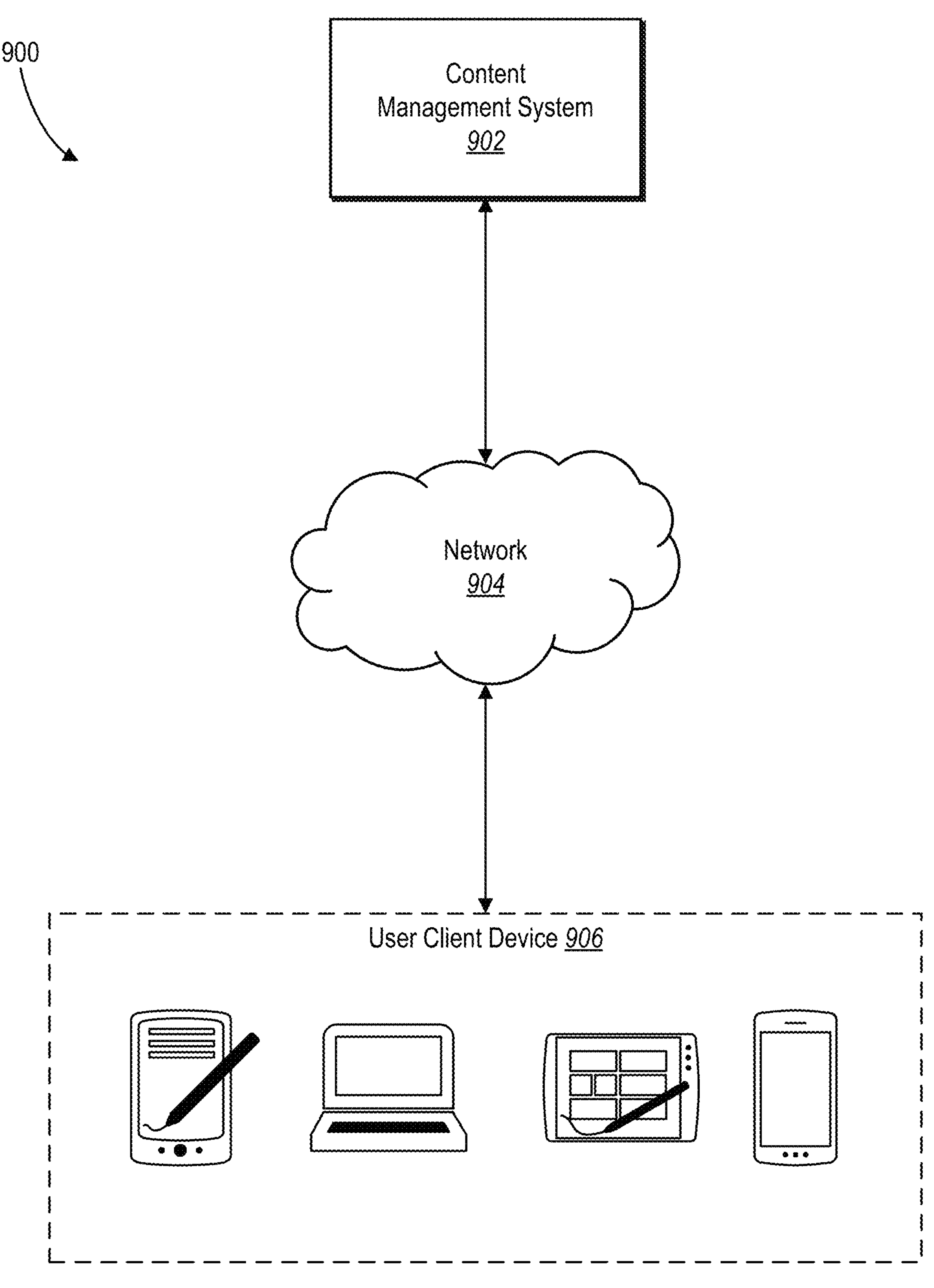
FIG. 9 illustrates a networking environment of a synthesized connector management system in accordance with one or more embodiments.

FIG. 9 is a schematic diagram illustrating environment 900 within which one or more implementations of the synthesized connector management system 120 can be implemented. As discussed above with respect to FIG. 9, in some embodiments the synthesized connector management system 120 can be part of a content management system 1002. In one or more embodiments, the content management system 902 may generate, store, manage, receive, and send digital content (such as digital videos). For example, content management system 902 may send and receive digital content to and from the user client device 906 by way of network 904. In particular, the content management system 902 can store and manage a collection of digital content. The content management system 902 can manage the sharing of digital content between computing devices associated with a plurality of users. For instance, the content management system 902 can facilitate a user sharing a digital content with another user of content management system 902.

In particular, the content management system 902 can manage synchronizing digital content across multiple of the user client device 906 associated with one or more users. For example, a user may edit digital content using user client device 906. The content management system 902 can cause user client device 906 to send the edited digital content to content management system 902. Content management system 902 then synchronizes the edited digital content on one or more additional computing devices.

In addition to synchronizing digital content across multiple devices, one or more implementations of content management system 902 can provide an efficient storage option for users that have large collections of digital content. For example, content management system 902 can store a collection of digital content on content management system 902, while the user client device 906 only stores reduced-sized versions of the digital content. A user can navigate and browse the reduced-sized versions (e.g., a thumbnail of a digital image) of the digital content on user client device 906. In particular, one way in which a user can experience digital content is to browse the reduced-sized versions of the digital content on user client device 906.

Another way in which a user can experience digital content is to select a reduced-size version of digital content to request the full- or high-resolution version of digital content from content management system 902. In particular, upon a user selecting a reduced-sized version of digital content, user client device 906 sends a request to content management system 902 requesting the digital content associated with the reduced-sized version of the digital content. Content management system 902 can respond to the request by sending the digital content to user client device 906. User client device 906, upon receiving the digital content, can then present the digital content to the user. In this way, a user can have access to large collections of digital content while minimizing the amount of resources used on user client device 906.

User client device 906 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. User client device 906 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 904.

Network 904 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which user client devices 906 may access content management system 902.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A system comprising:

at least one processor; and a non-transitory computer readable medium comprising instructions that, when executed by the at least one processor, cause the system to:

identify, from a plurality of content items ingested into a content management system through account-level application connectors comprising third-party integrations, a set of content items originating from a set of account-level application connectors of an individual connector type comprising a separate connection for each user account in a set of user accounts to a content item in the set of content items, wherein each content item in the set of content items is associated with a shared underlying content item;

generate a synthesized connector comprising a shared third-party integration by combining the set of account-level application connectors into a single data ingestion path that defines access control for the set of user accounts;

generate, through the synthesized connector, a synthesized content item by deduplicating content data included in the set of content items;

update a data repository to include the synthesized content item and the defined access control;

based on a synchronization interval, generate an updated synthesized connector based on the account-level application connectors;

generate, through the updated synthesized connector, an updated synthesized content item; and update the data repository to include the updated synthesized content item.

2. The system of claim 1, further comprising instructions that, when executed by the at least one processor, cause the system to define the access control by generating an access control list comprising one or more user accounts of the set of user accounts.

3. The system of claim 1, further comprising instructions that, when executed by the at least one processor, cause the system to generate the synthesized connector by combining a first type of account-level application connector and a second type of account-level application connector.

4. The system of claim 1, further comprising instructions that, when executed by the at least one processor, cause the system to:

receive, from a client device associated with a user account of the set of user accounts, a request to access the synthesized content item;

access, based on the request to access the synthesized content item, the synthesized content item within the data repository using the synthesized connector;

determine, based on the synthesized connector, that the defined access control permits access by the user account;

verify that an account-level application connector for the synthesized content item exists for the user account; and based on determining that the defined access control permits access and verifying that the account-level application connector exists, provide, for display via the client device, the content item.

5. The system of claim 1, wherein the data repository comprises a search index.

6. The system of claim 1, further comprising instructions that, when executed by the at least one processor, cause the system to:

determine that a number of user accounts identified by the access control equals zero; and based on determining that the number of user accounts equals zero, remove the synthesized content item from the data repository.

7. A computer-implemented method comprising:

identifying, from a plurality of content items ingested into a content management system through account-level application connectors comprising third-party integrations, a set of content items originating from a set of account-level application connectors of an individual connector type comprising a separate connection for each user account in a set of user accounts to a content item in the set of content items, wherein each content item in the set of content items is associated with a shared underlying content item;

generating a synthesized connector comprising a shared third-party integration by combining the set of account-level application connectors into a single data ingestion path that defines access control for the set of user accounts;

generating, through the synthesized connector, a synthesized content item by deduplicating content data included in the set of content items;

updating a data repository to include the synthesized content item and the defined access control;

based on a synchronization interval, generating an updated synthesized connector based on the account-level application connectors;

generating, through the updated synthesized connector, an updated synthesized content item; and updating the data repository to include the updated synthesized content item.

8. The computer-implemented method of claim 7, wherein generating the updated synthesized connector comprises:

detecting a discrepancy between the set of account-level application connectors and the synthesized connector; and updating the synthesized connector based on detecting the discrepancy.

9. The computer-implemented method of claim 7, further comprising:

identifying, from the plurality of content items, a subset of updated content items originating from a subset of account-level application connectors and a second subset of unchanged content items originating from a second subset of account-level application connectors; and generating an updated synthesized connector that includes the subset of account-level application connectors and excludes the second subset of account-level application connectors.

10. The computer-implemented method of claim 7, further comprising defining the access control by generating an access control list comprising one or more user accounts of the set of user accounts.

11. The computer-implemented method of claim 7, further comprising generating the synthesized connector by combining a first type of account-level application connector and a second type of account-level application connector.

12. The computer-implemented method of claim 7, further comprising:

receiving, from a client device associated with a user account of the set of user accounts, a request to access the synthesized content item;

accessing, based on the request to access the synthesized content item, the synthesized content item within the data repository using the synthesized connector;

determining, based on the synthesized connector, that the defined access control permits access by the user account;

verifying that an account-level application connector for the synthesized content item exists for the user account; and based on determining that the defined access control permits access and verifying that the account-level application connector exists, providing, for display via the client device, the content item.

13. The computer-implemented method of claim 7, further comprising:

determining that the set of content items comprise content items having matching portions and different portions; and generating, through the synthesized connector, the synthesized content item comprising the matching portions.

14. A non-transitory computer readable medium comprising instructions that, when executed by at least one processor, cause the at least one processor to:

identify, from a plurality of content items ingested into a content management system through account-level application connectors comprising third-party integrations, a set of content items originating from a set of account-level application connectors of an individual connector type comprising a separate connection for each user account in a set of user accounts to a content item in the set of content items, wherein each content item in the set of content items is associated with a shared underlying content item;

generate a synthesized connector comprising a shared third-party integration by combining the set of account-level application connectors into a single data ingestion path that defines access control for the set of user accounts;

generate, through the synthesized connector, a synthesized content item by deduplicating content data included in the set of content items;

update a data repository to include the synthesized content item and the defined access control;

based on a synchronization interval, generate an updated synthesized connector based on the account-level application connectors;

generate, through the updated synthesized connector, an updated synthesized content item; and update the data repository to include the updated synthesized content item.

15. The non-transitory computer readable medium of claim 14, further comprising instructions that, when executed by the at least one processor, cause the at least one processor to:

receive, from a client device associated with a user account of the set of user accounts, a request to access the synthesized content item;

access, based on the request to access the synthesized content item, the synthesized content item within the data repository using the synthesized connector;

determine, based on the synthesized connector, that the defined access control permits access by the user account;

verify that an account-level application connector for the synthesized content item exists for the user account; and based on determining that the defined access control permits access and verifying that the account-level application connector exists, provide, for display via the client device, the content item.

16. The non-transitory computer readable medium of claim 14, further comprising instructions that, when executed by the at least one processor, cause the at least one processor to:

determine that the set of content items comprise content items having matching portions and different portions; and generate, through the synthesized connector, the synthesized content item comprising the matching portions.

17. The non-transitory computer readable medium of claim 14, further comprising instructions that, when executed by the at least one processor, cause the at least one processor to:

determine that a number of user accounts identified by the access control falls below a threshold value; and based on determining that the number of user accounts falls below the threshold value, remove the synthesized content item from the data repository.

18. The non-transitory computer readable medium of claim 14, further comprising instructions that, when executed by the at least one processor, cause the at least one processor to generate the updated synthesized connector by:

detecting a discrepancy between the set of account-level application connectors and the synthesized connector; and updating the synthesized connector based on detecting the discrepancy.

19. The non-transitory computer readable medium of claim 14, further comprising instructions that, when executed by the at least one processor, cause the at least one processor to:

identify, from the plurality of content items, a subset of updated content items originating from a subset of account-level application connectors and a second subset of unchanged content items originating from a second subset of account-level application connectors; and generate an updated synthesized connector that includes the subset of account-level application connectors and excludes the second subset of account-level application connectors.

20. The non-transitory computer readable medium of claim 14, further comprising instructions that, when executed by the at least one processor, cause the at least one processor to:

define the access control by generating an access control list comprising one or more user accounts of the set of user accounts.

* * * * *